(12) United States Patent
Park et al.

(10) Patent No.: US 9,516,459 B2
(45) Date of Patent: Dec. 6, 2016

(54) METHOD AND APPARATUS FOR EXPRESSING THE ACCURACY OF A MEASURED LOCATION OF A TERMINAL

(75) Inventors: Do Hyung Park, Seoul (JP); Sung Cheol Kim, Goyang-si (JP); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1011 days.

(21) Appl. No.: 13/027,370

(22) Filed: Feb. 15, 2011

(65) Prior Publication Data
US 2012/0040697 A1   Feb. 16, 2012

(30) Foreign Application Priority Data

Aug. 12, 2010 (KR) .................. 10-2010-0077748

(51) Int. Cl.
*H04W 24/00* (2009.01)
*H04W 4/02* (2009.01)
*H04W 64/00* (2009.01)
*H04W 16/20* (2009.01)
*H04W 4/18* (2009.01)

(52) U.S. Cl.
CPC .............. *H04W 4/02* (2013.01); *H04W 4/025* (2013.01); *H04W 4/185* (2013.01); *H04W 16/20* (2013.01); *H04W 64/00* (2013.01)

(58) Field of Classification Search
CPC ..... H04W 64/00; H04W 4/02; H04W 4/028; H04W 4/04; H04W 4/025; H04W 4/22; H04W 16/20; H04W 4/021; H04W 84/045; G01S 5/14; G01S 5/02; G01S 5/0252; H04M 1/72572; H04M 2242/30; H04M 2250/06

USPC .......... 342/357.43, 463; 455/456.3, 424, 455/456.2, 456.1, 457, 412.1, 414.1; 370/328, 338; 709/203
See application file for complete search history.

(56) References Cited

U.S. PATENT DOCUMENTS 8,116,787 B1 *  2/2012  Lektuai ................. 455/456.2
8,750,894 B1 *  6/2014  Stogaitis ................ H04W 4/02
                                                        370/325

(Continued)

FOREIGN PATENT DOCUMENTS

JP      6-66917       3/1994
JP      6-148308      5/1994

(Continued)

OTHER PUBLICATIONS

Korean Office Action issued on Jun. 28, 2016 in counterpart Korean Patent Application No. 10-2010-0077748 (10 pages, with English translation)

*Primary Examiner* — Fred Casca
(74) *Attorney, Agent, or Firm* — NSIP Law (57) ABSTRACT

Provided is an apparatus and method for expressing an accuracy of a measured location of a terminal. The apparatus may include a storage unit to store accuracy information used for indicating an accuracy of a measured location corresponding to each of possible locations of the terminal. The apparatus may include a location information obtainment unit to obtain information associated with a location of the terminal. The apparatus may include a controller to express an accuracy of a measured location in the location of the terminal or an accuracy of a measured location in an area comprising the location of the terminal, based on the accuracy information.

17 Claims, 7 Drawing Sheets

(56) References Cited

U.S. PATENT DOCUMENTS

| | | | |
|---|---|---|---|
| 2007/0294724 A1* | 12/2007 | Kwon | 725/35 |
| 2010/0175116 A1* | 7/2010 | Gum | 726/6 |
| 2010/0322077 A1* | 12/2010 | Cho | G01S 5/021 370/241 |
| 2010/0324813 A1* | 12/2010 | Sundararajan | G01C 21/20 701/532 |
| 2011/0064312 A1* | 3/2011 | Janky et al. | 382/195 |

FOREIGN PATENT DOCUMENTS

| | | |
|---|---|---|
| JP | 2009-42045 | 2/2009 |
| KR | 10-2002-0074394 | 9/2002 |
| KR | 10-2005-0020135 | 3/2005 |
| KR | 10-2005-0093867 | 9/2005 |
| KR | 10-2006-012510 A | 12/2006 |
| KR | 10-0775858 B1 | 11/2007 |

* cited by examiner

METHOD AND APPARATUS FOR EXPRESSING THE ACCURACY OF A MEASURED LOCATION OF A TERMINAL

CROSS-REFERENCE TO RELATED APPLICATION(S)

This application claims the benefit under 35 U.S.C. §119(a) of Korean Patent Application No. 10-2010-0077748, filed on Aug. 12, 2010, in the Korean Intellectual Property Office, the entire disclosure of which is incorporated herein by reference for all purposes.

BACKGROUND

1. Field

The following description relates to a method and apparatus for expressing an accuracy of a measured location of a terminal.

2. Description of Related Art

A location measurement technology may be used to measure a location of a mobile terminal, and a location measurement result may be used to provide a variety of services in the mobile terminal. Accordingly, it may be useful and desirable for a user to be provided with the accuracy of the location measurement result.

SUMMARY

In one general aspect, there is provided an apparatus for expressing an accuracy of a measured location of a terminal, the apparatus comprising a storage unit to store accuracy information used for indicating an accuracy of a measured location corresponding to each possible location of the terminal, and a controller to express an accuracy of a measured location in a particular area, based on the accuracy information.

The accuracy information may comprise at least one of information associated with an accuracy of a measured location of each building present in the particular area, and information associated with an accuracy of a measured location in each of a plurality of sections, when one of the buildings comprises the plurality of sections.

The controller may be configured to express the accuracy of the measured location in the particular area, based on information associated with an accuracy of a measured location of each building present in the particular area.

When one of buildings present in the particular area comprises a plurality of sections, the controller may be configured to express the accuracy of the measured location in the particular area, based on information associated with an accuracy of a measured location in each of the sections.

The controller may be configured to express a building list that describes building identifiers of buildings present in the particular area, and an accuracy of a measured location corresponding to each of the building identifiers, or when one of buildings present in the particular area comprises a plurality of sections, the controller may be configured to express a section list that describes section identifiers of the sections and an accuracy of a measured location corresponding to each of the section identifiers.

The controller may be configured to express the accuracy of the measured location so that different accuracies of measured locations are differentiated from each other using at least one of a voice, a number, a character, a vibration, a sound, and a color or a shading on a map.

The apparatus may further comprise a location information obtainment unit to obtain information associated with a location of the terminal, wherein the controller may be configured to express an accuracy of a measured location in the location of the terminal or an accuracy of a measured location in an area comprising the location of the terminal, based on the accuracy information.

The accuracy of the measured location may comprise information regarding whether a location is measurable in the particular area.

In another aspect, there is provided an apparatus for expressing an accuracy of a measured location of a terminal, the apparatus comprising a location information obtainment unit to obtain information associated with a location of the terminal, a calculator to calculate an accuracy of a measured location in the location of the terminal, an expression unit to express the calculated accuracy of the measured location, and a controller to control the expression unit to express the calculated accuracy of the measured location in real time.

When the terminal comprises an execution icon associated with a location based service, the controller may be configured to control the execution icon based on the accuracy of the measured location.

The apparatus may further comprise a selector to select a scheme from a plurality of schemes for expressing the accuracy of the measured location, wherein the controller is configured to express the accuracy of the measured location according to the selected scheme.

The plurality of schemes may comprise at least one of a scheme of expressing the accuracy of the measured location using a number, a scheme of expressing the accuracy of the measured location using a character, a scheme of expressing the accuracy of the measured location using a vibration, a scheme of expressing the accuracy of the measured location using a sound, a scheme of expressing the accuracy of the measured location using a voice, a scheme of expressing the accuracy of the measured location using a distance, and a scheme of expressing the accuracy of the measured location using a map.

In another aspect, there is provided a method of expressing an accuracy of a measured location of a terminal, the method comprising accessing a storage unit where accuracy information used for indicating an accuracy of a measured location corresponding to each possible location of the terminal is stored, and expressing an accuracy of a measured location in a particular area, based on the accuracy information.

The accuracy information may comprise at least one of information associated with an accuracy of a measured location of each building present in the particular area, and information associated with an accuracy of a measured location in each of a plurality of sections, when one of the buildings comprises the plurality of sections.

The expressing may comprise expressing the accuracy of the measured location in the particular area, based on information associated with an accuracy of a measured location in each building present in the particular area.

The expressing may comprise expressing the accuracy of the measured location in the particular area, based on information associated with an accuracy of a measured location in each of a plurality of sections when one of buildings present in the particular area comprises the plurality of sections.

The expressing may comprise expressing a building list that describes building identifiers of buildings present in the particular area, and an accuracy of a measured location corresponding to each of the building identifiers, or may comprise expressing a section list that describes section identifiers of a plurality of sections and an accuracy of a measured location corresponding to each of the section identifiers when one of buildings present in the particular area comprises the plurality of sections.

The expressing may comprise expressing the accuracy of the measured location so that different accuracies of measured locations are differentiated from each other, using at least one of a voice, a number, a character, a vibration, a sound, and a color or a shading on a map.

The method may further comprise obtaining information associated with a location of the terminal, wherein the expressing comprises expressing an accuracy of a measured location in the location of the terminal or an accuracy of a measured location in an area comprising the location of the terminal, based on the accuracy information.

The accuracy of the measured location may comprise information regarding whether a location is measurable in the particular area.

In another aspect, there is provided a method of expressing an accuracy of a measured location of a terminal, the method comprising obtaining information associated with a location of the terminal, calculating an accuracy of a measured location in the location of the terminal, expressing the calculated accuracy of the measured location, and expressing the calculated accuracy of the measured location in real time.

The expressing may comprise controlling, based on the accuracy of the measured location, an execution icon associated with a location based service, when the terminal comprises the execution icon.

The method may further comprise selecting a scheme from a plurality of schemes for expressing the accuracy of the measured location, wherein the expressing comprises expressing the accuracy of the measured location according to the selected scheme.

The plurality of schemes may comprise at least one of a scheme of expressing the accuracy of the measured location using a number, a scheme of expressing the accuracy of the measured location using a character, a scheme of expressing the accuracy of the measured location using a vibration, a scheme of expressing the accuracy of the measured location using a sound, a scheme of expressing the accuracy of the measured location using a voice, a scheme of expressing the accuracy of the measured location using a distance, and a scheme of expressing the accuracy of the measured location using a map.

In another aspect, there is provided a computer-readable storage medium comprising program instructions for causing a processor to implement a method of expressing an accuracy of a measured location of a terminal, the method comprising accessing a storage unit where accuracy information used for indicating an accuracy of a measured location corresponding to each possible location of the terminal is stored, and expressing an accuracy of a measured location in a particular area, based on the accuracy information.

In another aspect, there is provided a terminal for expressing the accuracy of a measured location of the terminal, the terminal comprising a location information obtainment unit configured to measure location information about the location of the terminal, a calculator configured to calculate an accuracy of the measured location information about the location of the terminal, and a controller configured to express the accuracy of the measured location that includes the terminal, based on the calculated accuracy of the measured location information.

The terminal may further comprise a display, wherein the controller may be configured to express the accuracy of the measured location that includes the terminal on the display by displaying a map including a plurality of structures located around the terminal that are differentiated based on the calculated accuracy of the measured location of each respective structure.

The accuracy of each measured location of each respective structure may be differentiated on the map by at least one of a shape, a color, a size, and a shade.

The map may include a building that the terminal is located in and also a plurality of buildings located around the terminal.

At least one building may include a plurality of sections, the location information obtainment unit may be configured to measure location information of each section, the calculator may be configured to calculate the accuracy of each measured location of each section, and the map may express the accuracy of each measured location of each section.

The terminal may further comprise a speaker, wherein the speaker is configured to express the accuracy of the measured location using sound.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

The accuracy of a measured location may vary based on the environment, for example, based on an installation state of an infrastructure, a construction structure, a population density, and the like. The accuracy of the measured location may also vary based on a location measurement technology that is used to measure a section or an area.

For example, when the accuracy of the measured location varies based on a building included in the same area or a particular section of the building, a user may struggle to measure an accurate location of a terminal using the corresponding location measurement technology or using a service provided through the location measurement technology.

For example, when the user performs a location measurement function without being to aware of an accuracy of a measured location in a section where a terminal is positioned and the accuracy of the measured location is relatively low compared to general circumstances, the low accuracy of the measured location may decrease the user's confidence about the location measurement function or a location measurement system.

Accordingly, by providing an accuracy of a measured location to a user in advance using a method and apparatus for expressing an accuracy of a measured location of a terminal, it is possible to relieve a user's discontent and dissatisfaction that may occur in a location find service, a pedestrian navigation, a location based service (LBS) such as searching around a shopping mall or a mart, and the like.

The method and apparatus for expressing the accuracy of the measured location of the terminal according to the examples herein may be applicable to a mobile terminal and other devices desiring to be aware of a corresponding location, for example, a computer, a personal digital assistant (PDA), and the like.

The term "accuracy of a measured location" used throughout the specification indicates a level of a location measurement result within a range, for example, a constraint in an error of the measured location, a standard deviation of the error, a reliability for the measured location, a probability of the measured location, and the like.

The examples described herein relate to an apparatus and method for expressing the accuracy of measured locations of a terminal and measured locations around a terminal, for example, buildings, parks, structures, and the like. For example, if a terminal is disposed in an area near multiple buildings, the apparatus may provide a user of the terminal with a map that indicates the location of the terminal, the location of a building that the terminal is disposed in, the location of various buildings around and near the terminal, and the like. As another example, the apparatus may provide a user with a map that indicates various sections of a building that the user terminal is in, or that the user terminal is nearby.

Various features on the map may be modified by the apparatus to express the level of accuracy of each measured location in order to provide the user of the terminal with information about the reliability of the measured locations. For example, shading, coloring, sizing, vocal commands, and the like, may be used to distinguish more accurate measurements from less accurate measurements. The accuracy of the measurement may be determined by various location information and methods for determining location.

For example, based on the accuracy information, the user of the apparatus may be able to determine an area or a building that has more reliability in providing a service, such as a GPS service, and the like.

Figure 1:
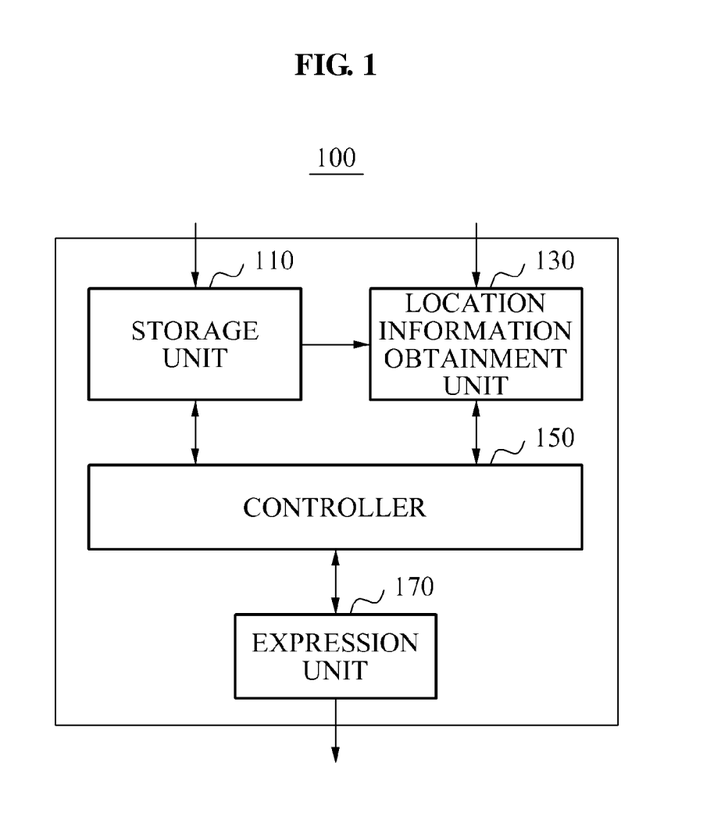
FIG. 1 is a diagram illustrating an example of an apparatus for expressing an accuracy of a measured location of a terminal.

FIG. 1 illustrates an example of an apparatus for expressing an accuracy of a measured location of a terminal (hereinafter, referred to as an accuracy expressing apparatus).

Referring to FIG. 1, accuracy expressing apparatus 100 includes a storage unit 110, a location information obtainment unit 130, a controller 150, and an expression unit 170.

The storage unit 110 may store accuracy information used for indicating an accuracy of a measured location corresponding to possible locations of the terminal. For example, the accuracy information may include at least one of information associated with an accuracy of a measured location in each building present in an area including the location of the terminal, and information associated with an accuracy of a measured location in each of a plurality of sections of a building.

For example, the storage unit 110 may store accuracy information associated with a variety of indoor and outdoor areas where the terminal may be positioned. The accuracy information may include a variety of other information used to provide a LBS, for example, map information associated with corresponding areas or sections, geographical information, and the like.

The location information obtainment unit 130 may obtain information associated with a current location of the terminal. Accordingly, the accuracy expressing apparatus 100 may recognize the current location of the terminal, and may provide the accuracy of a measured location in the current location of the terminal to a user. For example, the accuracy expressing apparatus 100 may recognize an accurate current location of the terminal prior to measuring the location of the terminal, prior to calculating the accuracy of the measured location, and the like.

The location information obtainment unit 130 may obtain information associated with a location of the terminal using, for example, a global positioning system (GPS) scheme using terminals installed with a GPS chip set, a proximity scheme of being proximate to a location of a cell base station serving the terminal, a triangulation location measurement scheme using a time of arrival (TOA)/time difference of arrival (TDOA), a proximate scheme of being proximate to a location of a wireless-fidelity (WiFi) access point (AP) connected in a local area network (LAN) environment, and the like.

The controller 150 may control the location information obtainment unit 130 and the expression unit 170 to express the accuracy of the measured location in the location of the terminal and/or the accuracy of the measured location in the area including the location of the terminal, for example, based on the accuracy information stored in the storage unit 110.

The controller 150 may control the location information obtainment unit 130 and the expression unit 170 to express the accuracy of the measured location in the location of the terminal and/or the accuracy of the measured location in the area including the location of the terminal, based on information associated with an accuracy of a measured location in each of buildings present in the area including the location of the terminal. An example of an accuracy expressing apparatus to express the accuracy of the measured location in buildings present in the area including the location of the terminal is described with reference to FIG. 3.

When one or more buildings present in the area including the location of the terminal include a plurality of sections, the controller 150 may control the location information obtainment unit 130 and the expression unit 170 to express the accuracy of the measured location in the location of the terminal and/or the accuracy of the measured location of each section of the building that includes a plurality of sections, based on information associated with an accuracy of a measured location in each of the sections. An example of an accuracy expressing apparatus to express the accuracy of the measured location in sections included in a building is described with reference to FIG. 4.

For example, the controller 150 may express a building list that describes building identifiers of buildings present in the area including the location of the terminal, and an accuracy of a measured location corresponding to each of the building identifiers.

For example, it may be assumed that in an area X including the location of the terminal, buildings such as a school, a police station, an apartment, a shopping center, and the like, may be present, and, as a building identifier, the school may be labeled with an "S", the police station may be labeled with a "P", the apartment may be labeled with an "A", and the shopping center may be labeled with an "M". As an example, an accuracy of a measured location may have an error range of 5m for the school, 3m for the police station, 8m for the apartment, and 6m for the shopping center.

In this example, with respect to the buildings present in area X, the accuracy expressing apparatus may provide a building list as shown in Table 1.

TABLE 1

| Building identifier | Building name | Accuracy of measured location(m) |
|---|---|---|
| A | OO apartment | 8 |
| M | OO shopping center | 6 |
| P | OO police station | 3 |
| S | OO elementary school | 5 |

The building list may be provided in a variety of forms. For example, in the building list, the accuracy of the measured location may be expressed using characters such as "accurate", "average", "inaccurate", "good", "average", "bad", "high", "intermediate", "low", and the like. As another example, various colors, shading, symbols, and the like, may be used.

Figure 3:
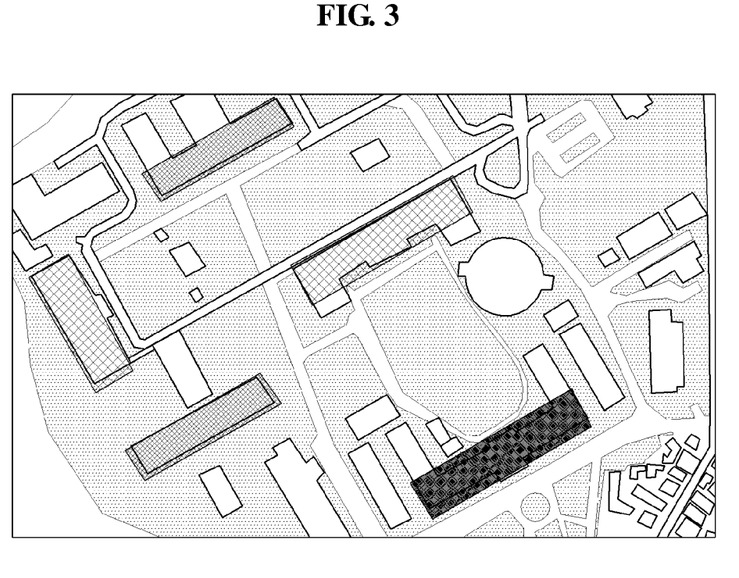
FIG. 3 is a diagram illustrating an example of an accuracy expressing apparatus to express an accuracy of a measured location in buildings present in an area including a location of a terminal.
Figure 4:
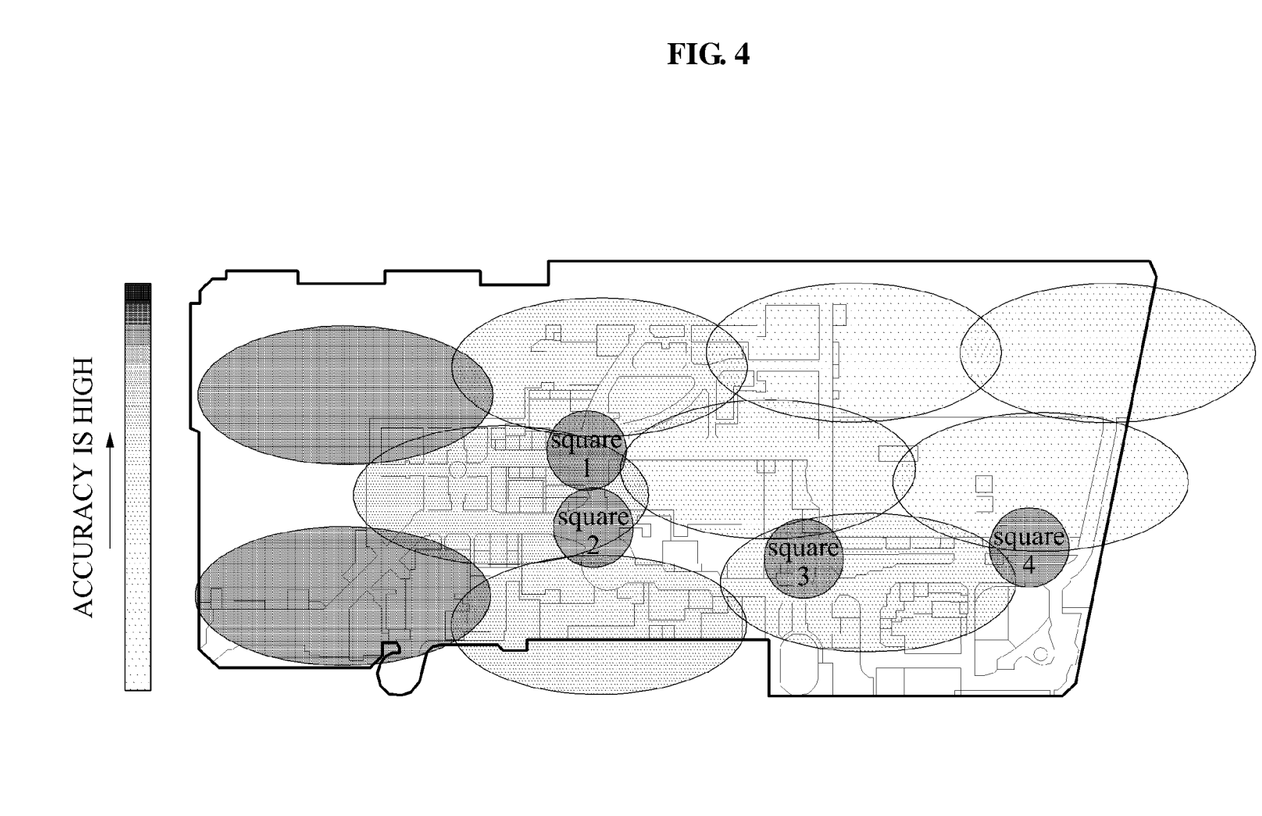
FIG. 4 is a diagram illustrating an example of an accuracy expressing apparatus to express an accuracy of a measured location of a plurality of sections of a building.

For example, the building list may be provided to the user in a form of a list, or may be provided to the user in a form combined with the accuracy of the measured location expressed in a map of FIG. 3 or FIG. 4.

As another example, when one of buildings present in the area including the location of the terminal includes a plurality of sections, the controller 150 may express a section list that describes section identifiers of the sections and an accuracy of a measured location corresponding to each of the section identifiers.

For example, from among the buildings present in area X of the above example, "OO shopping center" having the building identifier M may include a plurality of sections having section identifiers of a, b, c, d, and the like.

In this example, with respect to the plurality of sections (here, "a", "b", "c", and "d") included in "OO shopping center" present in area X, the accuracy expressing apparatus may express a section list as shown in Table 2.

TABLE 2

| Section identifier | Section name | Floor | Accuracy of measured location |
|---|---|---|---|
| a | entertainment & food section | 2 | good |
| b | miscellaneous sales section | 2 | good |

TABLE 2-continued

| Section identifier | Section name | Floor | Accuracy of measured location |
|---|---|---|---|
| c | electronic product section | 3 | average |
| d | baby product section | 4 | bad |

The controller 150 may control the location information obtainment unit 130 and the expression unit 170 to express the accuracy of the measured location so that different accuracies of measured locations may be differentiated from each other. For example, the measured locations may be expressed using at least one of a voice, a number, a character, a vibration, a sound, a color or a shading on a map, and the like.

For example, the controller 150 may control the location information obtainment unit 130 and the expression unit 170 to express the different accuracies of measured locations in the location of the terminal or in the area including the location of the area, using a voice with respect to each of the buildings or the sections. For example, the different accuracies of measured locations may be expressed using a voice saying that "the accuracy of the measured location with respect to OO building has an error rage of 5m, and the accuracy of the measured location with respect to an area X of OO building is good."

As another example, the controller 150 may control the location information obtainment unit 130 and the expression unit 170 to express the different accuracies in the location of the terminal or in the area including the location of the area, using a vibration strength or types of various vibrations. For example, when the accuracy of the measured location is relatively high, the controller 150 may express the accuracy of the measured location using consecutive vibrations, and the like. As another example, when the accuracy of the measured location is relatively low, the controller 150 may express the accuracy of the measured location by spacing vibrations at predetermined intervals, by alternatively expressing strong vibrations and weak vibrations, and the like.

The expression unit 170 may express the accuracy of the measured location. For example, the expression unit 170 may express the accuracy of the measured location in a variety of forms according to a control of the controller 150. As an example, the accuracy expressing apparatus 100 may express the accuracy of the measured location using a display unit included in the terminal, without having a separate expression unit of the accuracy expressing apparatus 100.

For example, an accuracy expressing apparatus may inform a user about an accuracy of a measured location in real time prior to measuring a location of a terminal, and the user may be allowed to make a decision regarding whether to measure the location of the terminal by referring to the informed accuracy of the measured location. For example, the accuracy expressing apparatus may express the accuracy of the measured location in advance using a main screen of the terminal, or a button or an icon for executing the accuracy of the measured location, thereby providing the user with a more reliable location based service (LBS).

Figure 2:
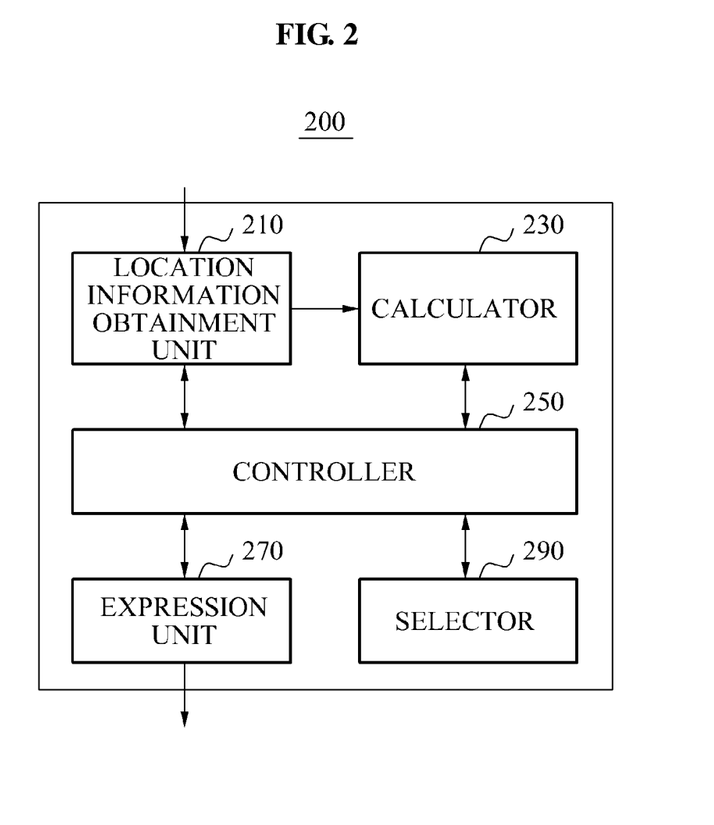
FIG. 2 is a diagram illustrating another example of an apparatus for expressing an accuracy of a measured location of a terminal.

FIG. 2 illustrates another example of an apparatus for expressing an accuracy of a measured location of a terminal.

Referring to FIG. 2, the accuracy expressing apparatus 200 includes a location information obtainment unit 210, a calculator 230, a controller 250, an expression unit 270, and a selector 290.

The location information obtainment unit 210 may obtain information associated with a location of the terminal. For example, the location information unit 210 may measure the location of the terminal using various sensors, devices, and the like such as a Global Positioning System (GPS).

The calculator 230 may calculate an accuracy of a measured location in the location of the terminal. For example, the calculator 230 may calculate the accuracy of the measured location in the corresponding location of the terminal based on the obtained information associated with the location of the terminal, and/or may use the calculated and stored accuracy of the measured location in the corresponding location of the terminal. It should be appreciated that the calculator 230 may calculate the accuracy of the measured location in the location of the terminal using a variety of known schemes.

The controller 250 may control the location information obtainment unit 210, the calculator 230, and the expression unit 270 to express the accuracy of the measured location in real time. When the terminal includes an execution icon associated with a LBS, the controller 250 may control the execution icon based on the accuracy of the measured location.

In this example, the LBS may correspond to an application, for example, various types of map views, an indoor and outdoor location find services, a pedestrian navigation, a friend find service, and the like.

For example, the accuracy of the measured location in the location of the terminal, calculated by the accuracy expressing apparatus 200, may be within the error range of 5m, and the accuracy expressing apparatus 200 may include an execution icon associated with the LBS.

In this example, the accuracy expressing apparatus 200, for example, the controller 250 may modify the execution icon associated with the LBS so that a number such as an error range 5m of the accuracy of the measured location may be combined with the execution icon and may be expressed. As another example, the controller 250 may modify the execution icon using a variety of colors, shading, and the like capable of expressing the accuracy of the measured location.

For example, the execution icon associated with the LBS may be provided in a map form, a form where the error range is indicated based on a measurement unit, a question mark, various types of icons or buttons enabling the user to recognize the LBS, and the like.

As another example, the controller 250 may control the execution icon using a scheme of differently expressing a color, shading, and the like of the various types of icons buttons based on the accuracy of the measured location.

The expression unit 270 may express the accuracy of the measured location. An example of a form of the accuracy of the measured location expressed on a screen of the terminal using the expression unit 270 is described with reference to FIG. 5. For example, the accuracy of the measured location information may be expressed in the form of a map that includes a location of the accuracy expressing apparatus 200, a building that the accuracy expressing apparatus 200 is located in, and/or buildings and/or other structures around which the accuracy expressing apparatus 200 is located.

The selector 290 may select a scheme from one or more schemes for expressing the accuracy of the measured location. The controller 250 may express the accuracy of the measured location according to the selected scheme. For example, a selection of the scheme for expressing the accuracy of the measured location may be received from the user, a scheme for expressing the accuracy of the measured location may be automatically selected using a scheme programmed in the terminal, and the like.

The one or more schemes for expressing the accuracy of the measured location may include, for example, at least one of a scheme of expressing the accuracy of the measured location using a number, a scheme of expressing the accuracy of the measured location using a character, a scheme of expressing the accuracy of the measured location using a vibration, a scheme of expressing the accuracy of the measured location using a sound, a scheme of expressing the accuracy of the measured location using a voice, a scheme of expressing the accuracy of the measured location using a distance, a scheme of expressing the accuracy of the measured location using a map, and the like.

FIG. 3 illustrates an example of an accuracy expressing apparatus to express an accuracy of a measured location in buildings present in an area including a location of a terminal.

Referring to FIG. 3, the accuracy expressing apparatus may express the accuracy of the measured location in the location of the terminal, based on information associated with an accuracy of a measured location in buildings present in an area including the location of the terminal, or may express the accuracy of the measured location in the area including the location of the terminal.

The accuracy expressing apparatus may express the accuracy of the measured location such that different accuracies of measured locations are differentiated from each other by different colors, shading, and the like for each of the buildings present on a map, based on accuracy information associated with the plurality of buildings present in the area including the location of the terminal.

For example, among the plurality of buildings present on the map, a building having a highly accurate measured location may be expressed using a relatively dark color or dark shading. A building having a less accurate measured location may be expressed using a relatively light color or a light shading.

Together with the accuracy of the measured location, a corresponding location of the terminal may also be expressed on the map.

FIG. 4 illustrates an example of an accuracy expressing apparatus to express an accuracy of a measured location in each of a plurality of sections of a building.

Referring to FIG. 4, for example, when one of buildings present in an area including a location of the terminal includes a plurality of sections, the accuracy expressing apparatus may express the accuracy of the measured location in the location of the terminal and/or the accuracy of the measured location in the area including the location of the terminal, based on information associated with an accuracy of a measured location in each of the sections.

In this example, the plurality of sections included in the single building may be separated from each other based on a floor unit, may be divided based on directions of the building such as east, west, south, and north, may be divided based on a form where a floor and a direction are combined, and the like.

Also, with respect to the plurality of sections included in the single building, the accuracy expressing apparatus may express the accuracy of the measured location such that different accuracies of measured locations may be discriminated from each other. For example, the accuracies may be differentiated from each other by using at least one of a voice, a number, a character, a vibration, a sound, a color and/or a shading on a map, and the like.

Figure 5:
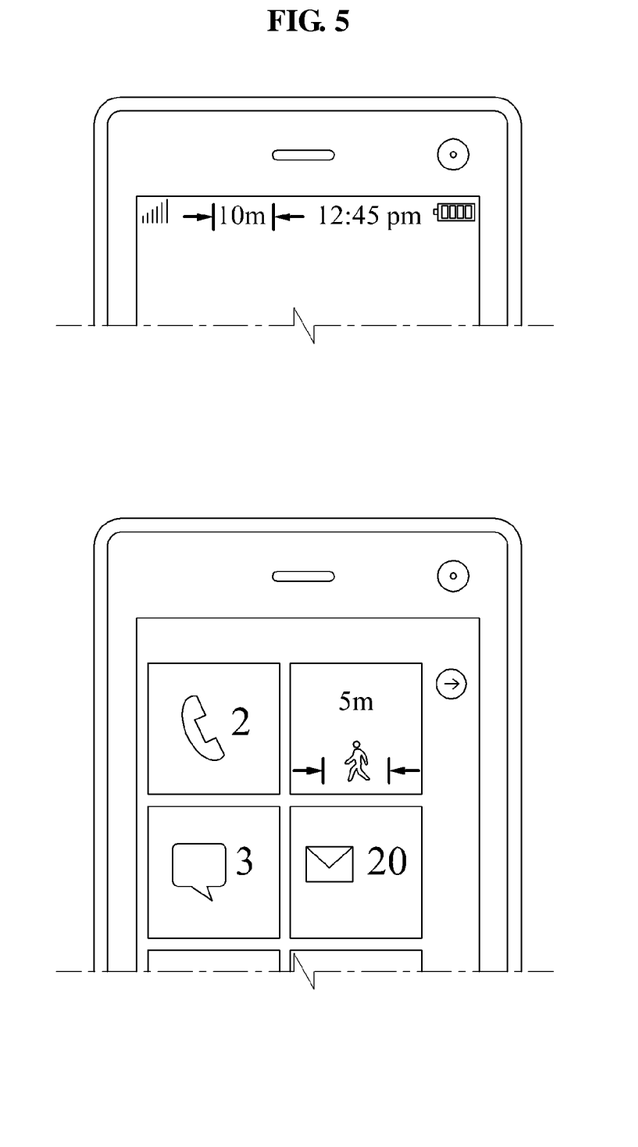
FIG. 5 is a diagram illustrating an example of an expression unit of an accuracy expressing apparatus that may be used to express an accuracy of a measured location in real time.

FIG. 5 illustrates an example of an expression unit of an accuracy expressing apparatus that may be used to express an accuracy of a measured location in real time.

Referring to FIG. 5, the accuracy expressing apparatus may express the accuracy of the measured location using a variety of schemes.

As shown in FIG. 5, one of the schemes may express the accuracy of the measured location on a main screen of the terminal. For example, when a user is in an area that does not feature good call quality, such as in the mountains, inside of an elevator, and the like, by expressing a call quality in advance on a main screen of the terminal, a user may recognize that a corresponding area is an area where the user cannot make a call or has a difficulty in making a call. In this example, even though the user may not readily make a call, it may be possible to relieve the user's psychological discontent.

Prior to performing a location measurement, a location measurement technology may also inform the user in advance in real time about an accuracy of a measured location in a current location of the terminal or in an area including the terminal. Accordingly, it may be possible to decrease a discontent of the user that may occur because the user fails to obtain a desired accuracy of a measured location.

When expressing the accuracy of the measured location on the main screen of the terminal, the accuracy of the measured location may be expressed as a distance, for example, 3m, 10m, and the like, which may be used to indicate an error range of the accuracy of the measured location.

The accuracy of the measured location may be expressed in a location that does not interrupt an operation of the user's terminal, for example, in an upper end or a lower end of the main screen.

As another example, the accuracy expressing apparatus may express the accuracy of the measured location on an execution icon or button associated with a variety of location measurement services, for example, a terminal positioning view, a map view, and the like.

For example, as shown in a bottom view of FIG. 5, by expressing the accuracy of the measured location in the current location of the terminal, i.e., 5m on a corresponding icon indicating the accuracy of the measured location, the user is able to recognize the accuracy of the measured location in advance.

When the terminal includes a variety of execution icons associated with a LBS, the accuracy expressing apparatus may control the execution icons based on the accuracy of the measured location.

For example, when the accuracy of the measured location in the current location is 3m, the user may recognize the accuracy of the measured location in advance by expressing "3 m" on or in the middle of an icon provided in a map form of expressing a LBS.

Figure 6:
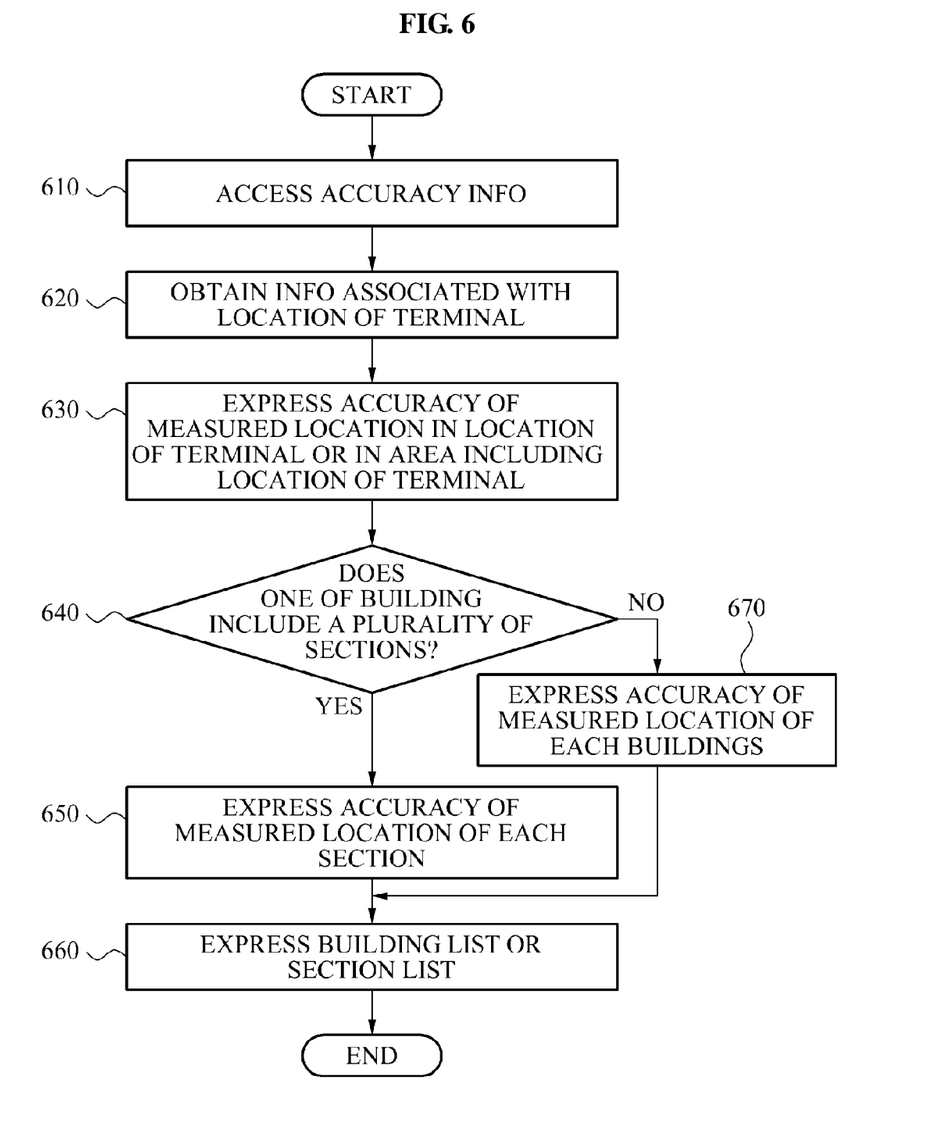
FIG. 6 is a flowchart illustrating an example of a method for expressing an accuracy of a measured location of a terminal.

FIG. 6 illustrates an example of a method for expressing an accuracy of a measured location of a terminal.

Referring to FIG. 6, in 610 an accuracy expressing apparatus accesses accuracy information, for example, the accuracy expressing apparatus may access a storage unit where accuracy information used for indicating an accuracy of a measured location corresponding to each of possible locations of the terminal is stored. In 620, the accuracy expressing apparatus obtains information associated with a location of the terminal.

For example, the accuracy information may include at least one of information associated with an accuracy of a measured location of each building present in the area including the location of the terminal, and information associated with an accuracy of a measured location in each of a plurality of sections of a building. For example, the accuracy information may include information about the accuracy of the measured location of the building that the user terminal is located in, and the accuracy of other buildings around and near the building that the user terminal is located in. As another example, the accuracy information may include information about a plurality of sections in a building that the user terminal is located in, or of a building that the user terminal is located nearby.

In 630, the accuracy expressing apparatus expresses the accuracy of one or more measured locations. For example, the accuracy expressing apparatus may express an accuracy of a measured location in the location of the terminal and/or an accuracy of a measured location in an area including the location of the terminal, based on the accuracy information.

In 640, the accuracy expressing apparatus determines whether one or more of buildings present in the area including the location of the terminal include a plurality of sections.

When one of the buildings includes the plurality of sections, the accuracy expressing apparatus may express the accuracy of the measured location in the location of the terminal or the accuracy of the measured location in the area including the location of the terminal, based on information associated with an accuracy of a measured location in each of the sections, in 650. For example, in 650 the accuracy expressing apparatus may express the plurality of sections and an accuracy of a measured location corresponding to each of the section identifiers.

In 660, the accuracy expressing apparatus may express a building list describing building identifiers of buildings present in the area including the location of the terminal, and an accuracy of a measured location corresponding to each of the building identifiers. Also, when one or more of the buildings present in the area including the location of the terminal includes the plurality of sections, the accuracy expressing apparatus may express a section list describing section identifiers of a plurality of sections and an accuracy of a measured location corresponding to each of the section identifiers.

As another example, when one of the buildings does not include a plurality of sections, the accuracy expressing apparatus may express the accuracy of the measured location in the location of the terminal and/or the accuracy of the measured location in the area including the location of the terminal, based on information associated with an accuracy of a measured location in each building present in the area including the location of the terminal, in 670.

In addition, the accuracy expressing apparatus may express the accuracy of the measured location such that different accuracies of measured locations may be differentiated from each other, for example, using at least one of a voice, a number, a character, a vibration, a sound, a color or a shading on a map, and the like.

Figure 7:
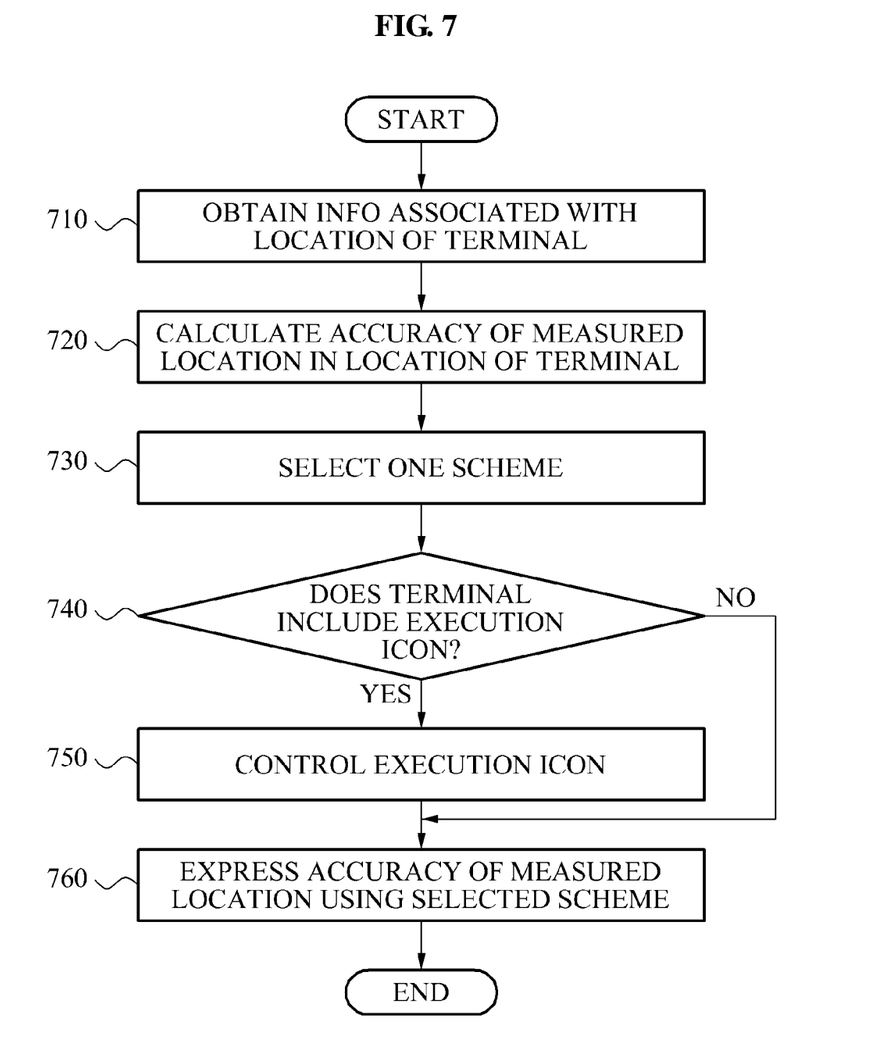
FIG. 7 is a flowchart illustrating another example of a method for expressing an accuracy of a measured location of a terminal.

FIG. 7 illustrates another example of a method for expressing an accuracy of a measured location of a terminal.

Referring to FIG. 7, an accuracy expressing apparatus obtains information associated with a location of the terminal in 710, and may recognize a current location of the terminal prior to obtaining the accuracy of the measured location.

For example, the method of expressing the accuracy of the measured location of the terminal may express an accuracy of a measured location in the current location of the terminal prior to performing a location measurement.

In 720, the accuracy expressing apparatus calculates an accuracy of a measured location in the location of the terminal. For example, the accuracy expressing apparatus may calculate the accuracy of the measured location using a variety of known schemes.

In 730, the accuracy expressing apparatus selects a scheme from one or more schemes for expressing the accuracy of the measured location. For example, the one or more schemes may include at least one of a scheme of expressing the accuracy of the measured location using a number, a scheme of expressing the accuracy of the measured location using a character, a scheme of expressing the accuracy of the measured location using a vibration, a scheme of expressing the accuracy of the measured location using a sound, a scheme of expressing the accuracy of the measured location using a voice, a scheme of expressing the accuracy of the measured location using a distance, a scheme of expressing the accuracy of the measured location using a map, and the like.

The accuracy expressing apparatus may express the accuracy of the measured location in real time.

In 740, the accuracy expressing apparatus determines whether the terminal includes an execution icon associated with a LBS. When the terminal includes the execution icon, the accuracy expressing apparatus may control the execution icon based on the calculated accuracy of the measured location, in 750.

For example, the accuracy of the measured location in the location of the terminal, calculated by the accuracy expressing apparatus, may be within the error range of 5m, and the accuracy expressing apparatus may include an execution icon associated with a LBS.

The accuracy expressing apparatus may modify the execution icon associated with the LBS so that a number such as an error range of 5m of the accuracy of the measured location may be combined with the execution icon and thereby be expressed. As another example, the accuracy expressing apparatus may modify the execution icon using a variety of colors, shading, and the like, which are capable of expressing the accuracy of the measured location.

In this example, the LBS may correspond to an application, for example, various types of map views, a location find service, a friend find service, and the like.

In 760, the accuracy expressing apparatus expresses the accuracy of the measured location using the selected scheme.

The examples of the apparatus for expressing the accuracy of a measured location of a terminal may also include a display or a screen that may be used to display the measured location information and the accuracy information. It should also be appreciated that the terminal may include a speaker or other auditory device that allows vocal descriptions to be output by the apparatus for expressing the accuracy of a measured location.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, to and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for expressing an accuracy of a measured location of a terminal, the apparatus comprising:
   memory configured to store a plurality of accuracy information of a measured location of a plurality of possible locations of the terminal, wherein an accuracy information of a measured location indicates a level of a location measurement result within a range; and a processor configured to
obtain a current location of the terminal,
determine a predetermined area including the current location, wherein the predetermined area comprises at least one section corresponding to at least one possible location of the terminal,
read at least one accuracy information corresponding to the at least one possible location within the predetermined area, from the memory, and
display the read accuracy information on the at least one section within the predetermined area of a map by using a preset indicator, wherein the map expresses the predetermined area,
wherein the processor is further configured to,
when an outdoor map includes at least one building in the predetermined area, display first accuracy information corresponding to at least one building, on the outdoor map, by using a first indicator including colors or shadings corresponding to the at least one building, and
when the at least one building includes a plurality of sections and an indoor map includes the plurality of sections, display second accuracy information corresponding to the plurality of sections, on the indoor map, by using a second indicator including colors or shadings corresponding to the plurality of sections.

2. The apparatus of claim 1, wherein the read accuracy information comprises at least one of information associated with an accuracy of a measured location of each building present in the predetermined area, and information associated with an accuracy of a measured location in each of the plurality of sections, in response to one of the buildings comprising the plurality of sections.

3. The apparatus of claim 1, wherein the processor is configured to display the read accuracy information in the predetermined area, based on information associated with an accuracy of a measured location of each building present in the predetermined area.

4. The apparatus of claim 1, wherein in response to one of buildings present in the predetermined area comprising the plurality of sections, the processor is configured to display the read accuracy information in the predetermined area, based on information associated with an accuracy of a measured location in each of the plurality of sections.

5. The apparatus of claim 1, wherein:
the processor is configured to display a building list that describes building identifiers of buildings present in the predetermined area, and an accuracy of a measured location corresponding to each of the building identifiers, or
in response to one of buildings present in the predetermined area comprising the plurality of sections, the processor is configured to display a section list that describes section identifiers of the plurality of sections and an accuracy of a measured location corresponding to each of the section identifiers.

6. The apparatus of claim 1, wherein the processor is configured to display the read accuracy information so that different accuracies of measured locations are differentiated from each other using at least one of a voice, a number, a character, a vibration, a sound, and a color or a shading on a map.

7. The apparatus of claim 1,
wherein the processor is configured to display an accuracy of a measured location in the current location of the terminal or an accuracy of a measured location in an area comprising the current location of the terminal, based on the read accuracy information.

8. The apparatus of claim 1, wherein the read accuracy information comprises information regarding whether a location is measurable in the predetermined area.

9. A method of expressing an accuracy of a measured location of a terminal, the method comprising:
obtaining by a processor a current location of the terminal;
determining by the processor a predetermined area including the current location, wherein the predetermined area comprises at least one section corresponding to at least one possible location of the terminal;
reading by the processor at least one accuracy information corresponding to the at least one possible location within the predetermined area, from a memory where a plurality of accuracy information of a measured location of a plurality of possible locations of the terminal are stored, wherein an accuracy information of a measured location indicates a level of a location measurement result within a range; and
displaying by the processor the read accuracy information on the at least one section within the predetermined area of a map by using a preset indicator, wherein the map expresses the predetermined area
wherein the displaying comprises,
when an outdoor map includes at least one building in the predetermined area, displaying first accuracy information corresponding to at least one building, on the outdoor map, by using a first indicator including colors or shadings corresponding to the at least one building, and
when the at least one building includes a plurality of sections and an indoor map includes the plurality of sections, displaying second accuracy information corresponding to the plurality of section, on the indoor map, by using a second indicator including colors or shadings corresponding to the plurality of sections.

10. The method of claim 9, wherein the read accuracy information comprises at least one of information associated with an accuracy of a measured location of each building present in the predetermined area, and information associated with an accuracy of a measured location in each of the plurality of sections, in response to one of the buildings comprising the plurality of sections.

11. The method of claim 9, wherein the displaying comprises displaying the read accuracy information in the predetermined area, based on information associated with an accuracy of a measured location in each building present in the predetermined area.

12. The method of claim 9, wherein the displaying comprises displaying the read accuracy information in the predetermined area, based on information associated with an accuracy of a measured location in each of the plurality of sections in response to one of buildings present in the predetermined area comprising the plurality of sections.

13. The method of claim 9, wherein:
the displaying comprises displaying a building list that describes building identifiers of buildings present in the predetermined area, and an accuracy of a measured location corresponding to each of the building identifiers, or displaying a section list that describes section identifiers of the plurality of sections and an accuracy of a measured location corresponding to each of the section identifiers in response to one of buildings present in the predetermined area comprising the plurality of sections.

14. The method of claim 9, wherein the displaying comprises displaying the read accuracy information so that different accuracies of measured locations are differentiated from each other, using at least one of a voice, a number, a character, a vibration, a sound, and a color or a shading on a map.

15. The method of claim 9,
wherein the displaying comprises displaying an accuracy of a measured location in the current location of the terminal or an accuracy of a measured location in an area comprising the current location of the terminal, based on the read accuracy information.

16. The apparatus of claim 9, wherein the read accuracy information comprises information regarding whether a location is measurable in the predetermined area.

17. A non-transitory computer-readable storage medium comprising program instructions for causing a processor to implement a method of expressing an accuracy of a measured location of a terminal, the method comprising:
obtaining a current location of the terminal;
determining a predetermined area including the current location, wherein the predetermined area comprises at least one section corresponding to at least one possible location of the terminal;
reading at least one accuracy information corresponding to the at least one possible location within the predetermined area, from the memory where a plurality of accuracy information of a measured location of a plurality of possible locations of the terminal are stored, wherein an accuracy information of a measured location indicates a level of a location measurement result within a range; and
displaying the read accuracy information on the at least one possible location within the predetermined area of a map by using a preset indicator, wherein the map expresses the predetermined area
wherein the displaying comprises,
when an outdoor map includes at least one building in the predetermined area, displaying first accuracy information corresponding to at least one building, on the outdoor map, by using a first indicator including colors or shadings corresponding to the at least one building, and
when the at least one building includes a plurality of sections and an indoor map includes the plurality of sections, displaying second accuracy information corresponding to the plurality of sections, on the indoor map, by using a second indicator including colors or shadings corresponding to the plurality of sections.

* * * * *